April 22, 1958 R. K. LOCKHART 2,831,919

SIGNAL FILTERING SYSTEM FOR COLOR TELEVISION RECEIVER

Filed Dec. 31, 1953 3 Sheets-Sheet 1

INVENTOR.
ROBERT K. LOCKHART

BY [signature]

ATTORNEY

April 22, 1958 R. K. LOCKHART 2,831,919

SIGNAL FILTERING SYSTEM FOR COLOR TELEVISION RECEIVER

Filed Dec. 31, 1953 3 Sheets-Sheet 2

INVENTOR.
ROBERT K. LOCKHART

BY [signature]
ATTORNEY

SIGNAL FILTERING SYSTEM FOR COLOR TELEVISION RECEIVER

Filed Dec. 31, 1953

INVENTOR.
ROBERT K. LOCKHART
BY [signature]
ATTORNEY

United States Patent Office 2,831,919

Patented Apr. 22, 1958

2,831,919

SIGNAL FILTERING SYSTEM FOR COLOR TELEVISION RECEIVER

Robert K. Lockhart, Moorestown, N. J., assignor to Radio Corporation of America, a corporation of Delaware

Application December 31, 1953, Serial No. 401,586

4 Claims. (Cl. 178—5.4)

The present invention relates to signal filtering circuits, and more particularly to I-signal peaking and delay circuits in color television receivers.

Color television is the reproduction on the viewing screen of a receiver of not only the relative luminescence or brightness, but also the color hues and saturations of the details in the original scene.

Complete coherence between the transmitter and receiver is essential in the successful operation of television equipment. As a result much emphasis is placed on the development and utilization of efficient transmission methods. This is particularly true in color television wherein not only is it necessary to transmit black-and-white information but also the chrominance information associated with the subject being televised.

The electrical transfer of images in color may be accomplished by additive methods. Additive methods produce natural color images by breaking down the light from an object into a predetermined number of selected primary or component colors. Color images may be transferred electrically by analyzing the light from an object into not only image elements as is accomplished by a normal scanning procedure but by also analyzing the light from elemental areas of objects or images into selected primary or component colors and thereby deriving therefrom a signal representative of each of the selected component colors. A color image may be then reproduced at a remote point by appropriate reconstruction from a component color signal train.

In order to utilize the existing radio frequency spectrum most advantageously, there has been proposed a color television system which conforms to a set of standards known as the NTSC compatible television standards which are described at page 88 of "Electronics" for February 1952. In this system, the transmission of a brightness signal is substantially the same as that conventionally employed for black and white television transmission. In addition, a color sub-carrier wave, spaced from the main carrier wave by a frequency substantially equal to that of an odd multiple of one-half the line scanning frequency, is employed to carry the chromaticity information.

The monochrome and color signals occupy the same frequency band, that is, the band normally required for the transmission of monochrome pictures. This is possible because the spectrum of a television picture consists essentially of discrete frequencies with the energy concentrated near harmonics of line frequency (even harmonics of half line frequency). This spectrum results because television pictures are reproduced by a periodic scanning process; each picture contains a very high amount of redundancy and a spectrum can therefore be expressed approximately as a Fourier series. The spectrum of the signal consists also such bunches of energy corresponding to the color information and these are interleaved in the gaps of monochrome spectrum at locations corresponding to odd harmonics of half-line frequency.

The monochrome signal voltage, $E_y$, can be obtained directly from a camera whose output is proportional to luminance. More usually it is made up by combining voltages ($E_r$, $E_g$, and $E_b$ related to the red, green, and blue reproducing primaries) which are derived from a three-color camera. In the latter case, the three components $E_r$, $E_g$, and $E_b$ are combined in proportion to their contribution to the total luminance.

The luminance signal is made up as follows:

$$E_y=0.59E_g+0.30E_r+0.11E_b \tag{1}$$

This expression indicates that the green, red, and blue reproducing primaries contribute respectively 59, 30 and 11 percent of the luminance of white (defined by the chromaticity coordinates $x=0.310$; $y=0.316$, that is, illuminant C). Note that the sum of the numerical factors in Eq. 1 is unity.

The system is so proportioned that white is produced when $E_r=E_g=E_b$. Hence for white light, substituting in Eq. 1.

$$E_y=E_r=E_g=E_b \tag{1a}$$

It is evidently desirable that the coloring information disappear when there is no color. For this reason, this information is transmitted in terms of two components $(E_r-E_y)$ and $(E_b-E_y)$ which are called "color difference" signals. From Eq. 1*a* $(E_r-E_y)=0=(E_b-E_y)$ for white light (no color).

Since the eye is insensitive to color in fine detail, these color-difference signals are usually, but not necessarily, limited in bandwidth to 1 or 2 mc.

Green, when present, is transmitted by these signals even though it does not appear explicitly. Green is, as Eq. 1 states, the main component of $E_y$. The color receiver recovers $(E_r-E_y)$ and $(E_b-E_y)$. The receiver can obtain $(E_g-E_y)$ by a mixture of $-.051(E_r-E_y)$ and the $-0.19(E_b-E_y)$, as shown below.

Substituting Eq. 1 in $(E_r-E_y)$ and $(E_b-E_y)$ we obtain $$\begin{aligned}&-0.51(E_r-E_y)-0.19(E_b-E_y)=-0.51\\ &(-0.59E_g+0.70E_r-0.11E_b)-0.19E_g-0.30E_r+0.89E_b)\\ &=0.41E_g-0.30E_r-0.11E_b\\ &=E_g-(0.59E_g+0.30E_r+0.11E_b)\\ &=E_g-E_y\end{aligned} \tag{2}$$

The color receiver adds the luminance signal to each color-difference signal as follows:

$$(E_r-E_y)+E_y=E_r \tag{3a}$$

$$(E_b-E_y)+E_y=E_b \tag{3b}$$

$$(E_g-E_y)+E_y=E_g \tag{3c}$$

The voltages $E_r$, $E_g$ and $E_b$ are applied between the respective control grids and cathodes of a three-gun color picture tube. This may be done by applying $E_y$ to one electrode, and the color-difference signal to the other.

The foregoing discussion is over-simplified because the light output (L) of the picture tube is not directly proportional to the electrical input (E) but varies approximately as a power ($\gamma$) of this input as $$L=KE^{\gamma} \tag{4}$$

The voltages applied to the picture tubes must therefore be predistorted by a process called gamma correction. One way in which this is done is by transmitting the following signals:

(1) A monochrome signal made up of gamma-corrected primary voltages described as follows:

$$E_y'=0.587E_g^{1/\gamma}+0.299E_r^{1/\gamma}+0.11E_b^{1/\gamma} \tag{5}$$

(2) The two "color-difference" components $$(E_r^{1/\gamma}-E_y') \text{ and } (E_r^{1/\gamma}-E_y')$$

The actual process of transmitting the two color difference components involves a modulated subcarrier. A sine wave can carry two independent sets of modulation by modulating in amplitude with one set and in phase with the other, or, what is essentially the same thing, by splitting the sine wave into two components and amplitude modulating each component with one set of information. Each modulation can then be recovered by heterodyning the modulated wave with a sine wave having the same frequency and phase as the carrier component carrying the desired modulation. This process is sometimes called synchronous detection and must not be confused with other forms of detection which recover the modulation envelope.

In order to more efficiently transmit the color information it is convenient to use a more efficient utilization of the color sideband information. This involves the use of what are known as I and Q signals, where $$E_I' = -.274E_G^{1/\gamma} + .596E_r^{1/\gamma} - .322E_b^{1/\gamma} \quad (6)$$

$$E_Q' = -.522E_g^{1/\gamma} + .211E_r^{1/\gamma} + .311E_b^{1/\gamma} \quad (7)$$

The color difference signals may then be related to the I and Q signals by use of the following relationships.

$$\frac{E_g^{1/\gamma} - E_y'}{.703} = -.399E_I' - .900E_Q' \quad (8)$$

$$\frac{E_r^{1/\gamma} - E_y'}{1.141} = .839E_I' + .545E_Q' \quad (9)$$

$$\frac{E_b^{1/\gamma} - E_y'}{2.030} = .545E_I' + .839E_Q' \quad (10)$$

In the system of transmission of color television signals which conform to the NTSC standards it is proposed that the Q color signals be limited in bandwidth to frequencies resulting in sideband frequencies in the double sideband region; this region extends from 0 to almost 600 kc. The I signal is so composed that it is double sideband up to 425 kc. and single sideband from this point up to almost 1.8 megacycles. Thus, no crosstalk appears between the two signals for frequencies exceeding the double sideband region since only one signal is transmitted in what is termed the single sideband region. This results in a two-color image reproduction for signal frequencies outside the double sideband region, and a three-color image reproduction for signal frequencies within the double sideband region. This mode of transmission is described in detail in a copending U. S. patent application of David G. C. Luck, entitled "Color Television," Serial No. 223,021, filed on April 26, 1951. It has been found that limiting the bandwidth of one of the color signals in accordance with the teachings of the Luck patent application results in an improved color television system.

According to the Field Test Signal Specifications for color television transmission adopted by the National Television System Committee on February 2, 1953, which incorporate some of the principles taught by the aforementioned patent application of David G. C. Luck, it is contemplated that the color subcarrier wave be modulated by the two signals referred to as the "I" signal and the "Q" signal. Utilizing the aforementioned band-widths with the "I" signal utilized as the wideband color signal representing selected portions of three primary colors, which when taken in combination with the brightness signal provides two-color information suitable for reproduction of a color television image along a two-color gamut between the color orange and the color cyan.

The selection of the orange-cyan gamut was made after exhaustive studies on the acuity of the human eye for resolving small area information. Since the eye is more sensitive to small area information along a gamut between orange and cyan than for other combinations of colors, these colors were chosen for a suitable two color signal.

For low signal frequencies in the region from 0 to 600 kc, the color information is transmitted by means of both sidebands, using the "Q" signal, which comprises selected portions of signals representing the three primary colors so as to provide three-color information when taken in combination with the brightness signal and those double sideband components present in the "I" signal, which modulates the other phase of the color subcarrier wave. In such a system, narrow band signals representing color difference signals may be derived directly from the color subcarrier wave without reference to the "I" and "Q" signals. However, this information must necessarily be limited to the bandwidth of the "Q" signal since spurious information resulting from crosstalk occurs for signal frequencies in excess of the highest frequency transmitted in the double sideband region of the color subcarrier wave.

According to the Field Test Signal Specifications of the National Television System Committee, phases of the color subcarrier wave modulated by the "I" and "Q" signals are such that the component of the color subcarrier wave representing the red color difference signal lags the "I" signal component by 33°. In like manner, the component of the color subcarrier wave representing the blue color difference signal lags the "Q" signal component by 33°.

The most serious disadvantage of the two-phase modulation technique is the need for carrier reinsertion at the receiver. This characteristic makes the technique economically undesirable in many applications, but its use in compatible color television systems is entirely feasible because of the fact that time is available (during the blanking intervals necessarily provided in a television system) for the transmission of carrier-synchronizing information. Under the proposed NTSC signal specification, the subcarrier-synchronizing information consists of "bursts" of at least 8 cycles of the subcarrier frequency of 3.58 megacycles at a predetermined phase transmitted during the "back porch" interval following each horizontal synchronizing pulse. The "bursts" are separated from the rest of the signal at the receiver by appropriate time-gating circuits, and are used to control the receiver local oscillator through a phase detector and reactance tube. The phase of the I signal lags the phase of the burst by 57° and leads the phase of the Q signal by 90°.

The "I" and "Q" signals may be derived from such a color subcarrier wave by heterodyning the color subcarrier wave with locally generated waves having the same phase as those supplied to the "I" and "Q" modulators respectively at the transmitter. Thus, if a wave of sine $\omega t$ is heterodyned with the color subcarrier wave, the modulation products will include a signal equal to the "Q" signal, and if a wave of cosine $\omega t$ is heterodyned with the color subcarrier wave, modulation products include a signal equal to the "I" signal.

Because of the unusual nature of the I signal, a special type of circuitry in a color television receiver is necessary to properly treat both the single sideband information and the double sideband information contained in the signal so that correct amplitude, timing, and phases of the final color signals are achieved.

It is therefore an object of this invention to provide a filter system for providing I signal timing compensation in a color television receiver.

It is another object of this invention to provide a means for increasing the amplitude of harmonic components over a finite range of frequencies for a prescribed amount as compared to those amplitudes corresponding to another range of frequencies.

It is still a further object of this invention to provide a means for treating demodulated waveforms containing both double sideband information and single sideband information so that the single sideband information component amplitudes are restored to a level commensurate with that of the amplitudes of the components representing the double sideband information.

It is still a further object of this invention to produce a step-type pass band for the I signal of a color television receiver.

It is yet another object of this invention to produce both a step-pass-band and an I-phase correction characteristic for accommodating the demodulated I signals in the color television receiver.

According to this invention a phase-corrector bridged T filter with an *m* value of approximately 1.5 is placed in the output of the color demodulator in a color television receiver to permit I peaking, I to Q time delay matching, and I phase correction in one circuit. If the input of the filter is fed from the low impedance source and the bridging capacitor is connected to bridge both the coil and the input termination, the low frequencies are double terminated while the highs are single terminated. This yields a peaked response over the spectrum range corresponding to the single-sideband signal range in the I signal.

Other and incidental objects of this invention will become apparent upon a reading of the following specification and an inspection of the drawings in which.

The invention to be described is applicable to any system which employs filter networks whereby information is recovered from a subcarrier containing both double sideband information and single sideband information. However, without departing from the broad spirit of the invention, it should be noted that the invention is particularly applicable to color television and constitutes an important improvement in the method of peaking the upper component frequencies of the demodulated I signal from the color subcarrier. The I signal constitutes an unusual form of signal information in that it contains double sideband energy from 0 to approximately 500 kc. and single sideband energy from there to approximately 1½ megacycles. In order for proper recovery of the color difference information contained by this signal it is necessary to subject this double and single sideband energy to circuitry which can yield the final color difference signal in an efficient and accurate manner.

Figure 1:
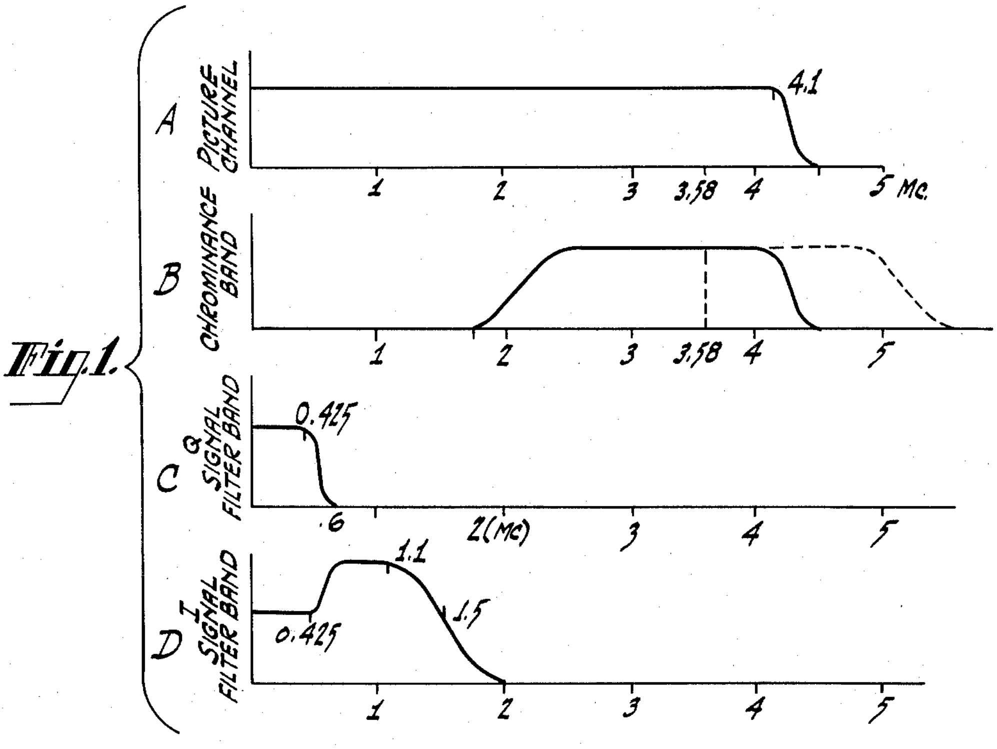
Figure 1 shows the spectral bands for (*a*) a television picture channel, (*b*) the chrominance band, (*c*) the Q signal filter band and (*d*) the I signal filter band.

In order to understand more fully the need for both such a signal and the invention which pertains to the demodulation of this signal consider the nature of the signals which are used for color television transmission conforming to the set of standards known as the NTSC compatible television standards. Figure 1(*a*) shows the picture channel. Note that the spectrum is confined to a region less than 4½ megacycles wide and that the spectrum sharply decrease in amplitude beyond 4.1 megacycles. It has been mentioned that the color subcarrier frequency is 3.58 megacycles. It is evident this color subcarrier frequency is slightly greater than a half megacycle from the upper end of the picture frequency spectrum.

Consider Figure 1(*b*) now which shows what is called the chrominance filter band. The information must necessarily be located about the color subcarrier frequency 3.58 mc. If the frequencies involved for the color information are to be in the neighborhood or slightly exceeding 1 mc., it is evident from the band shown in Figure 1(*b*) that the upper portion of this band will be at a higher frequency than that permitted for the upper frequency range of the television picture spectrum. However, if color information representing harmonics of only up to ½ megacycle are required note that this information could easily be obtained or transmitted in the permissible television spectrum range.

Therefore, it is evident that the use of the I and Q signals has been instituted to overcome severe spectrum range difficulty. By attempting a Q signal which involves harmonics less than 600 kc. in accordance to the filter band shown in Figure 1(*c*), then the television picture channel can easily accommodate double sideband information corresponding to the Q signal in the permitted spectral range. However when the higher harmonics constituting detail in the color information are to be utilized it is evident that whereas a lower sideband flanking a 3.58 mc. color subcarrier frequency can be easily accommodated in the permitted spectrum range, that the upper sideband can only be accommodated up to around 4.1 mc. or barely more than 600 kc. beyond the color subcarrier frequency. Therefore it is evident that one method of sending out these very important higher frequency components of the I signal is to have the I signal contain a double sideband information for harmonics up to ½ mc. and from that range on to contain only single sideband information describing harmonics which describe orange-cyan line information.

Figure 2:
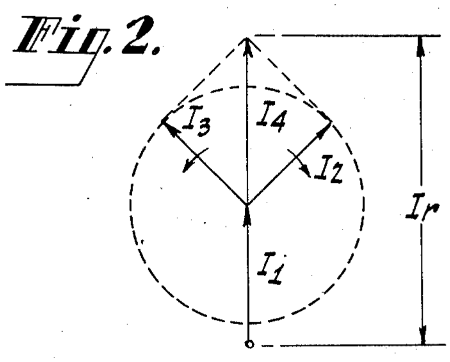
Figure 2 shows a carrier vector which is subjected to double sideband amplitude modulation.

The method of transmitting the I signal utilizing both the double sideband range and the single sideband range is an efficient method of utilizing the television spectrum permitted for commercial television. However, by sending out the single sideband information in what may be regarded as a primarily double sideband transmission system, it is evident that the spectrum energy corresponding to the single sideband region is only ½ of what it would be were the signal to be double sidebanded for all color difference signal components. Therefore, once detection of the I signal has been accomplished, or as in the case of the present invention, during the synchronous detection of the I signal, it is necessary to compensate for the spectrum amplitude loss due to the loss of the sideband. In addition some phase correction is necessary. This can be accomplished in succeeding stages by use of appropriate equalization networks. The effect of eliminating a sideband is graphically illustrated by the vector diagram shown in Figures 2 and 3. In Figure 2 the carrier $I_1$ is acted upon by an upper sideband $I_2$ and a lower sideband $I_3$ which revolve in opposite directions with respect to each other and if the frame of reference is presumed to be revolved at carrier angular frequency these sideband vectors may be assumed to be rotating as shown from the tip of the carrier vector. The net result of the action of these sidebands is to produce a resultant vector which either adds to or subtracts from the amplitude of the carrier vector producing the resultant vector $I_r$. When $I_3$ and $I_2$ have reached a position to give a maximum value of their resultant vector $I_4$ the result is that $I_1$ is increased by $I_4$ which for this case has an amplitude twice the amplitude of either of the component sideband vectors.

Figure 3:
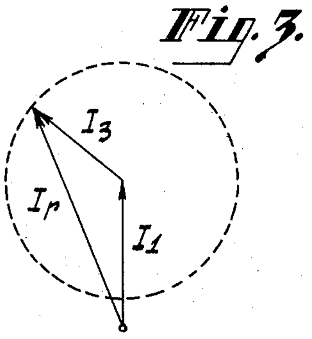
Figure 3 shows a carrier vector which is subjected to single sideband amplitude modulation.

Figure 3 shows the case when the sideband vector $I_2$ is eliminated. It is evident here that at no time can the total amplitude be greater than the sum of $I_1$ and $I_3$ and that some phase distortion is inherent in this system. However had the system containing the sideband vector $I_3$ and the carrier vector $I_1$ been passed through a network which increased the sideband $I_3$ to twice the value it is evident that the amplitude characteristics of the double sideband transmission have been regained though, of course, equalizing networks would be necessary to accommodate the phase shifts involved.

Figure 4:
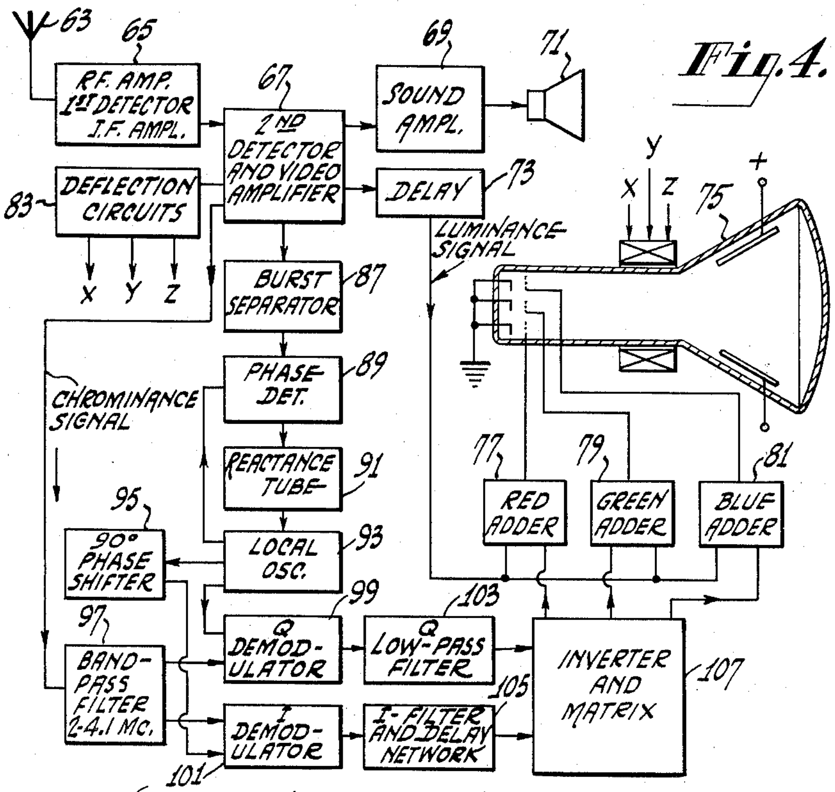
Figure 4 shows the block diagram of a color television receiver showing using dotted lines the bridge T circuit with which the invention is concerned.

Turning now in more detail to the present invention for the filtering and delay of the I-signal in the color television receiver, consider the overall circuit shown in Figure 4. Here the transmitted color signal reaches the antenna 63 from which point it is applied to the R. F. amplifier, the first detector, and the intermediate frequency amplifier all blocked together as 65. The signal then enters the second detector and video amplifier 67 in which part of the receiver the color television video signal is recovered from the transmitted signal. There are numerous methods of recovering the sound information from the transmitted television signal. One is to use a sound trap in the intermediate amplifier section; the most commonly used at the present day is the one based on the well known principle of intercarrier sound whereby the sound signal is recovered in the video amplifier 67. Once the audio signal is recovered it is then sent through the sound amplifier 69 and applied to the loudspeaker 71. There are four branches which utilize the detected video signal as obtained from the second detector and the video amplifier 67. One circuit branch directs the luminance signal toward the color kinescope 75 where it is used to control luminance by being applied to all kinescope guns in equal proportions; the luminance signal is actually sent through the delay network 73 and then impressed on the red adder 77, the green adder 79, and the blue adder 81 within which circuits the luminance signal is also combined with the color difference signals which will be supplied by the inverter and matrix 107. In a second branch, the video signal is applied to the deflection circuits 83 in which circuits the synchronizing information is separated, utilized to operate the deflection circuits which supply deflection signals to the yokes of the kinescope 75. A third branch utilizes the synchronizing information which is necessary for proper phasing of the I and Q signals within the color television receiver. The complete video signal is applied to the burst separator 87 which separates the burst signal following the horizontal synchronizing pulse and applies this separated burst signal to the phase detector 89. At the same time a local oscillator 93 is generating a signal the same frequency as a color subcarrier. The output of this local oscillator is sent in part to the phase detector 89 where it is compared to the incoming signal from the burst separator. Should these signals not be in proper phase, the phase detector presents a correcting signal to the reactance tube circuit 91 which returns the local oscillator output to a phase determined by that of the synchronizing burst.

The fourth branch from the second detector and video amplifier 67 deals with the chrominance signal. This chrominance signal is passed through the band pass filter 97 which removes all components outside of the band from 2 to 4.1 mc. This filtered chrominance signal is then simultaneously applied to the Q demodulator 99 and the I demodulator 101. In order that synchronous detection of the I and Q signals can be accomplished, a local oscillator signal is impressed into the Q demodulator 99 and also into the I demodulator 101 using a 90° phase shifter 95. Once the Q demodulator has yielded the Q signal this Q signal is passed through the Q filter 103. In like fashion the I demodulator yields the I signal which is then passed through a filter and delay circuit 105. The color difference signals corresponding to the I and Q signals are impressed into the inverter and matrix network 107 from which the component color signals corresponding to red, green, and blue issue to the adders 77, 79 and 81 which combine the correct amount of red, green, and blue with the luminance signal, the combined signal being impressed on the grids of the tri-color kinescope 75.

Figure 5:
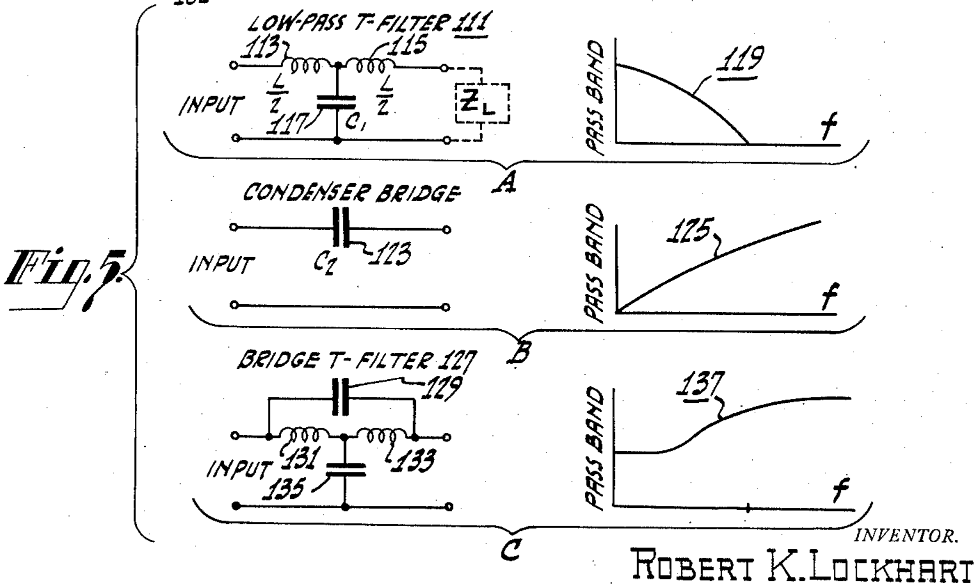
Figure 5 shows (A) a low pass T filter and its pass band characteristics, (B) a condenser bridge circuit and its pass band characteristics, (C) a bridge T filter and its pass band characteristics.

The invention is concerned with the specific circuit denoted as a I-filter and delay network 105 in Figure 4. Before considering the nature of this circuit, however, it is instructive to study some other electrical characteristics of systems which are in effect fundamental components of the systems to be described. Turning first to Figure 5, it is seen in Figure 5(A) that a low pass T filter may be formed by combining the inductances 113, 115 with the shunt capacitance 117 to form the T network whose pass band characteristics with proper termination are well known to yield the pass band shape of the type shown in the curve 119. For such a filter it is well known that the cut off frequency $f_c$ is given by the relationship $$f_c=\frac{1}{\pi\sqrt{LC}} \qquad (11)$$

where C is the capacitance of the condenser in farads and $L/2$ is the inductance in henries represented by either of the two inductances 113, 115.

Figure 5(B) shows the use of a condenser as a condenser-bridge where it is evident that the ability of this condenser to transmit a wave through it is dependent upon the impedance as presented by the condenser as a function of frequency. The transmission pass band then of the condenser bridge 123 is that shown by the curve 125 where it is seen that at 0 frequency no transmission takes place whatever; this transmission increases rapidly for an increase in frequency as a function.

Figure 5(C) shows the general effect which is obtained by combining the circuits shown in Figure 5(A) and Figure 5(B), that is to use a condenser 129 to bridge the low pass filter made up of the serially connected inductances 131 and 133 and the shunt capacitance 135 thereby yielding the bridged T filter 127. The operation of this bridge T filter follows directly from the operation of the circuit shown in Figure 5(A) and Figure 5(B) yielding the pass band curve 137 where at low frequencies the low frequency low pass T filter is the deciding network. At upper frequencies where the low pass filter has ceased to transmit, the condenser network performs the function of transmission. By properly choosing characteristics of the low pass filter for the condenser bridge a step, or a near step, type of pass band characteristic can be achieved.

In many color television receivers, particularly those which are built with economy a primary objective, a circuit such as that shown in Figure 5(C) might serve as a suitable solution for peaking the frequencies representing the single side frequency range. However, there is one aspect of the transmission of the I and Q signals which must be observed. Both the I and Q signals have bandwidths which are related to the particular signals involved. The bandwidths of the filter network necessary for proper filtering of the Q signal is limited to the range of approximately 0 to 500 kc.; as has been seen the bandwidths of the I signal as shown in Figure 1(D) extends to almost 2 megacycles. As is known from elementary transmission circuit theory the time delays inherent in transmission filter networks having such cutoff characteristics will be different. This means that unless suitable means are included in the circuit not only will the I and Q signal arrive at the inverter and matrix elements 107 and 109 incorrectly phased, but they will also be improperly phased with respect to the luminance signal. It is therefore necessary in color television receivers where accuracy of color picture representation is a primary object to install a suitable delay element so that the luminance signal, the I signal, and the Q signal arrive in suitable time phase with the system components which combine these signals and apply them to the tri-color kinescope 75. As will be seen, one of the features of the present invention is that I signal filtering is not only achieved in a useful and efficient fashion, but that also the I signal is suitably delayed so that its transmission is matched with that of the Q signal and no additional time delay circuits or compensation circuits are necessary in addition to achieving the step characteristic so essential to proper handling of the demodulated I signal.

Therefore, it is of advantage to turn to a circuit which follows from the broader aspects of the bridged-T filter 127 shown in Figure 5(C).

Figure 6:
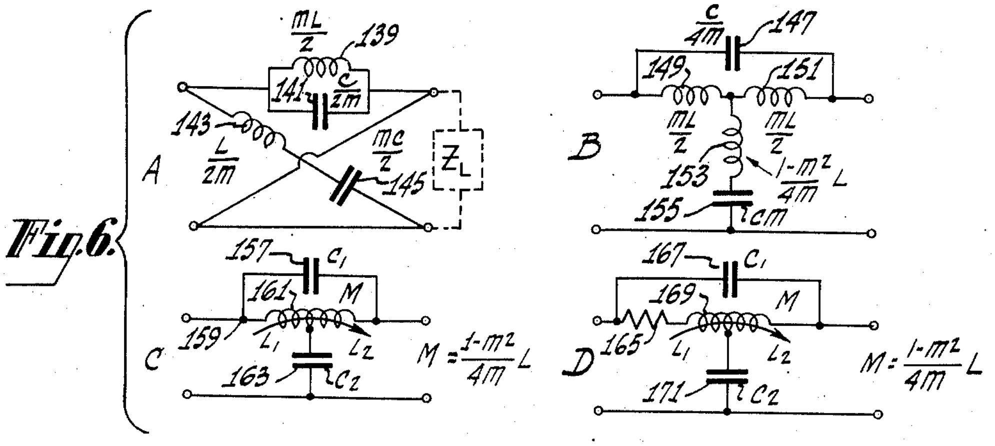
Figure 6 shows (A) a symmetrical lattice network, (B) a bridged-T network, (C) a bridged-T network utilizing a center-tapped inductance arm, (D) a bridged-T network having higher-frequency amplitude compensation.

Figure 6(A) shows one-half of a symmetrical lattice network which comprises a series arm with an inductance 139 connected in parallel with the capacitance 141. The cross-connected arm comprises the serially connected inductance 143 and the capacitance 145. If the cross-connected arm has the value of inductance and capacity such as to be the inverse of the series arm, then the impedance will be constant and the attenuation of the lattice network will be 0.

As is known in the art, in order that there be no reflections at the input and output terminals of the network when inserted into a transmission line, the square root of the product of the series arm and the cross arm must be equivalent to the characteristic impedance of the line. A lattice network which will meet these conditions is provided if the inductance 139 has a value of $mL/2$ while the inductance 143 has a value of $L/2m$ and the capacitances 141 and 145 have values of $C/2m$ and $mC/2$ respectively, and where $$L=\frac{R}{\pi f_0} \qquad (12)$$

$$C=\frac{1}{\pi f_0 R} \qquad (13)$$

where R is the line impedance and $f_0$ is the resonant frequency of L and C; i. e.

$$f_0=\frac{1}{2\pi\sqrt{LC}} \qquad (14)$$

The inserted phase angle of the network, as a function of frequency is given by the expression $$\tan\theta=\frac{2mK(1-K^2)}{1-(2+m^2)K^2+K^4} \qquad (15)$$

where $$K=\frac{2f}{f_0}=\frac{2\omega}{\omega_0} \qquad (16)$$

$f$ being the driving frequency.

In order that the phase angle be a linear function of frequency, the value of $m$ required can be ascertained by taking the first derivative of the phase angle with respect to $k$ and then by Bode's method which is known in the art, the value of $m$ can be found such that the quotient representing the derivative has a denominator which is equal to or larger than the numerator. The value of $m$ so found will then insure a linear phase shift with respect to frequency over the predetermined range of frequencies. For the particular network shown, the value of $m$ found is 1.73. By allowing for a slight departure from linearity the band width can be enlarged appreciably without introducing phase shift difficulties. The lower limit for $m$ under those conditions is 1.60 and ordinarily the preferred is 1.65. Using such a value of $m$ will insure a phase shift which has less than one degree deviation from strict linearity up to at least $\frac{9}{10}$ of the resonant frequency, i. e., $\omega/\omega_0$ equal to $\frac{9}{10}$. Consequently, the network shown in Figure 6(A), having the values above described, will have the characteristics of constant impedance, zero attenuation, and linear phase shift over the predetermined range of frequencies for which the network has been designed.

By methods heretofore known, the lattice network may be transformed to the bridged-T network shown in Figure 6(B). The series arm of the lattice network is replaced by parallelly connected condenser 147 and two serially connected inductances 149 and 151. The cross arms are replaced by a shunt arm comprising the inductance 153 and the capacitance 155. If the values of inductance and capacities are those shown in Figure 6(B) in which the parameter L$m$ is included then the filter network in Figure 6(B) will be identical to that in Figure 6(A).

It will be recognized that the arrangement of the three inductances 149, 151, and 153 is the equivalent of two inductances connected in series and coupled to each other so that their fields aid, with the coupling so adjusted that the mutual inductance M is equal to $$M=\frac{1-m^2}{4m}L$$

with the two inductances each having a value of $mL/2$. It then follows that the bridged-T network circuit shown in Figure 6(C) is the equivalent of the lattice network shown in Figure 6(A) and of the bridged-T network shown in Figure 6(B) provided that the following relationships are adhered to $$M=\frac{1-m^2}{2\pi.4m}\frac{R}{f_0} \qquad (17)$$

$$L_1=\frac{MR}{4\pi f_0} \qquad (18)$$

$$C_1=\frac{1}{8\pi R f_0 M} \qquad (19)$$

$$C_2=\frac{M}{2\pi R f_0} \qquad (20)$$

where $$R^2=\frac{L}{C} \qquad (21)$$

Thus far the present invention has suggested the use of a bridged-T network of the type shown in Figure 6(C) for performing the function of filtering and phase compensation. It has been found experimentally and can be shown analytically that for a value of $m$ equal to approximately 1.5 which is not optimum to show a complete linear phase shift with respect to frequency a bridge-T network is suitable for use with an I signal circuit in that it does yield a transmission characteristic which matches the transmission of the I signal with that of the Q signal which employs a standard low pass filter. Though the value of $m=1.5$ has been used successfully, it will be recognized of course that this is an approximation and that a substantial range of values in the vicinity of this value will be suitable for satisfactory use in a color television receiver. However, though suitable phase compensation and time delay characteristics have been achieved by the design of a filter circuit shown in Figure 6(C), there is still absent the step function type of response curve which is so essential for optimum utilization of the I signal. Figure 6(D) shows a basic approach to obtaining this step type response characteristic which will be described in more detail in the final embodiment of the invention in Figure 7, and in Figure 8. In Figure 6(D) a resistor 165 has been added in series with the series arm inductance 169 and the bridging condenser 167 has been allowed to bridge both the inductance 169 and the resistance 165. Since the bridging element is essentially a high frequency pass network and the T-network comprising the inductance 169 and the condenser 162 is essentially a low frequency pass network, the inclusion of the resistor 165 will result in higher frequencies being passed without attenuation and with the lower frequency reduced in amplitude and level to an extent dependent upon the amount of loss produced by the resistor 165. By suitable choice of this resistor it is therefore possible to achieve both suitable time delay characteristics for the I signal and also the step type response function which as has been stated, is so essential to the optimum utilization of the I signal.

Figure 7:
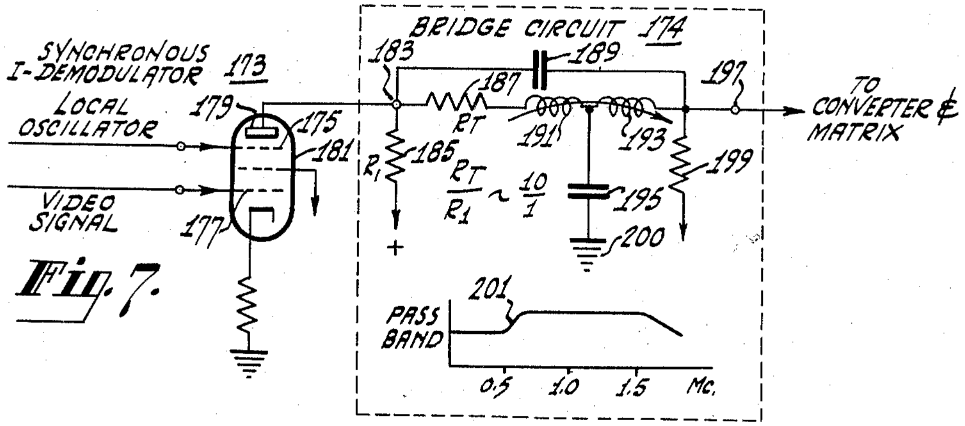
Figure 7 shows a schematic diagram of the bridge T circuit used for peaking the upper spectral components of the demodulated I signal and Figure 8 shows an alternative circuit connection for the circuit shown in Figure 6.

Turning now in detail to the compensation of the bridged-T circuit as included in the color television receiver demodulator for transmission of the demodulated I signal, consider the circuit shown in Figure 7. This circuit includes a bridged-T circuit 174 which is identical to that circuit shown in Figure 6(D). This bridged-T circuit 174 is a portion of the output circuit of a synchronous demodulator stage 173 which consists of a multi-grid electron control tube 181 having a plurality of control grids. Upon one of the two control grids 177 the video signal is applied. At the other control grid, in this case grid 175 the local oscillator signal is applied. By properly biasing and applying potentials to this tube 181 synchronous detection will take place and there will issue forth from the anode 179 of this tube 181 a signal which consists of demodulated I signal. This signal will pass to terminal 183 to which is connected the bridged-T circuit 174 and also the load resistor 185. The bridge circuit 174 includes the bridging condenser 189, the coupled inductances 191 and 193 and the condenser shunt arm 195 which is coupled to ground 200. A resistor 199, suitable for coupling a bias voltage to a succeeding stage, is coupled to the output terminal 197. The output terminal 197 of the bridged-T circuit 174 then is coupled by the use of suitable connectors to the inverter and matrix circuits to which the I signal is applied so that it can be combined with the Q signals and the luminance signal to form the necessary component signals which are then applied to the tri-color kinescope 75. The action of the bridged-T circuit is, as has been stated, identical to that of the circuit shown in Figure 6(D). However, consider the effect of having this circuit operate in conjunction with the output resistor 185. If the resistor 185 is denoted as $R_1$ and the bridged-T circuit resistor 181 is denoted as resistor $R_t$, then it is useful to prescribe the relationship that $$\frac{R_t}{R_1} \sim \frac{10}{1} \tag{22}$$

By adhering to such a relationship the input to the bridged-T circuit 174 is therefore fed from a low impedance source. And since the bridging capacitor 189 bridges both the inductances 191 and 193 and the resistor 187, the low frequencies are double terminated while the high frequencies are single terminated. This yields the peaked response 201 which is desired of the system. It is important to note that this peaked response is not at the expense of the I to Q time delay matching which is a feature of the present invention. If resistor 187 is not used, the bridge circuit 174 will provide I to Q time delay matching; in circuits not requiring single sideband amplitude compensation, the bridge circuit 174 sans resistor 187 provide highly useful time compensation characteristics.

Figure 8:
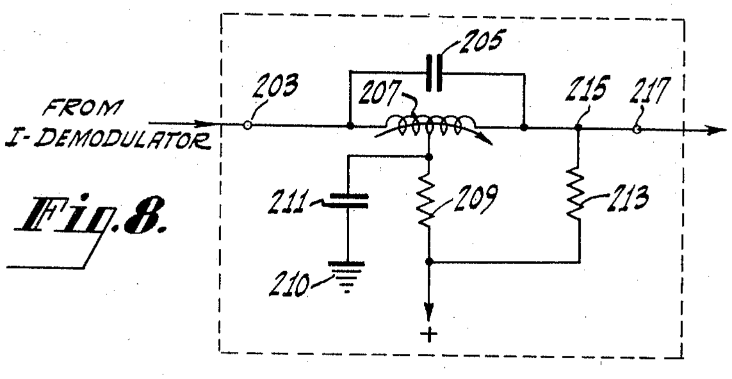

Figure 8 shows an alternative connection for the bridged-T circuit 105. Here an inductance coil 207 is bridged by the capacitor 205 with the condenser 211 connected from the middle of the inductance to the ground terminal 210. However, to provide proper loading for the demodulator circuit the resistors 209 and 213 are so connected that resistor 209 is applied directly to the center tap of the inductance coil 207 and resistor 213 is applied to the output terminal 215, thereby simplifying the connections of the system.

Having thus described the invention, what is claimed is:

1. A suppressed carrier signalling system adapted to receive a modulated carrier signal containing at least a sideband derived from a set of modulating signals having a lower first frequency range and a higher second frequency range, the combination of, a synchronous detector, signal developing means producing oscillations having the frequency of said carrier and a prescribed phase, means for applying said modulated carrier signals and said oscillations to said synchronous detector to yield detection of said modulating signals; and a bridge network having an input circuit coupled to the output of said detector and having an output circuit, said bridge network including a low pass filter network having a pass band corresponding to said first frequency range and including means for introducing attenuation in said first frequency range, means for bridging said low pass filter by a high frequency network having a pass band suitable for transmission of said second frequency range, said bridge network being constructed to yield a signal at said output circuit of said bridge network wherein the relative amplitude level of components in said second frequency range of said set of modulating signals is at a prescribed ratio as compared to the relative amplitude level of components in said first frequency range.

2. In a color television receiver adapted to receive a color subcarrier modulated by at least two color difference signals, the first of said color difference signals producing a double sideband signal set corresponding to a band of lower frequency having a prescribed bandwidth from zero frequency to a predetermined frequency, and the second of said color difference signals producing a double sideband signal set corresponding to a band of lower frequency modulating components having a first prescribed bandwidth from zero frequency to said first prescribed frequency and a single sideband set corresponding to a band of higher frequency modulating components having a prescribed bandwidth from said first prescribed frequency to a higher second prescribed frequency, a first and second synchronous demodulator for detecting respectively said first color difference signal and said second color difference signal from said color subcarrier, a low pass filter means having a pass band for the transmission of frequencies from zero frequency to said first prescribed frequency with a first time delay, means coupling said low pass filter means to the output of said first demodulator, and a filter network coupled to the output of said second synchronous demodulator and including a series arm composed of a condenser connected in parallel with two serially connected inductances and an attenuator, said inductances including means to produce negative mutual inductance, and a shunt arm comprising a condenser connected to the common junction point of said inductance, said filter network being constructed to increase the output level of said filter network from said first prescribed frequency to said second prescribed frequency relative to the output level from zero frequency to said first prescribed frequency, said filter network also being constructed to provide said first time delay to said second color difference signal.

3. In a color television receiver adapted to receive a color subcarrier containing at least two color difference signals, the first of said color difference signals having a double sideband signal set corresponding to a band of frequencies having a prescribed bandwidth from zero frequency up to a first frequency, and the second of said color difference signals having a double sideband signal set corresponding to a band of lower frequencies having a prescribed bandwidth from zero frequency to said first frequency and a single sideband set corresponding to a band of higher frequencies having a bandwidth from said first frequency to said second frequency, the combination of, means for providing a signal having the frequency of the color subcarrier signal and including circuit means for developing a demodulating signal having a phase corresponding to said second color difference signal; a synchronous demodulator electron control tube having a cathode, a first control electrode, a second control electrode; an attenuating bridged-T circuit consisting of a series arm composed of a condenser connected in parallel with two serially connected inductances and an attenuation means and including means for coupling said inductances to produce negative mutual inductance, and a capacitive shunt arm connected to the common junction point of said inductances, means for establishing a parameter *m* of approximately 1.5 in said bridged-T circuit; means for connecting said signal providing means to one of said control electrodes of said synchronous detector electron control tube, means for coupling said color subcarrier to the second of said control electrodes of said synchronous detector electron control tube for causing said second color difference signal to be developed and, means for causing said second color difference signal to pass through staid bridged-T circuit, said attenuation means being proportioned to cause the range of frequencies from said first to second frequency in said second color difference signal to be transmitted through said bridged-T network at a prescribed proportion of the level afforded those frequencies lying in the range from zero to said first frequency.

4. The invention as set forth in claim 3 and wherein the value of the characteristic parameter *m* is in the range from 1.45 to 1.55.

References Cited in the file of this patent

UNITED STATES PATENTS

| | | |
|---|---|---|
| 2,238,023 | Klipsch | Apr. 8, 1941 |
| 2,304,545 | Clement | Dec. 8, 1942 |
| 2,523,299 | Hendrickson | Sept. 26, 1950 |
| 2,583,552 | Edwards | Jan. 29, 1952 |
| 2,605,355 | Foster | July 29, 1952 |
| 2,605,396 | Cheek | July 29, 1952 |

FOREIGN PATENTS

| | | |
|---|---|---|
| 706,006 | France | Mar. 23, 1931 |

OTHER REFERENCES

Principles of NTSC Compatible Color Television Electronics, pages 88–97, February 1952.